(12) United States Patent
Ahnoff et al.

(10) Patent No.: US 10,079,995 B1
(45) Date of Patent: Sep. 18, 2018

(54) METHODS AND SYSTEMS FOR GENERATING RESOLUTION BASED CONTENT

(71) Applicant: Cisco Technology, Inc., San Jose, CA (US)

(72) Inventors: Mattias Ahnoff, Fornebu (NO); Erik Hellerud, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/643,812

(22) Filed: Jul. 7, 2017

(51) Int. Cl.
*H04N 7/14* (2006.01)
*H04L 29/06* (2006.01)
*H04N 7/15* (2006.01)

(52) U.S. Cl.
CPC .......... *H04N 7/147* (2013.01); *H04L 65/403* (2013.01); *H04L 65/602* (2013.01); *H04N 7/15* (2013.01)

(58) Field of Classification Search
CPC combination set(s) only.
See application file for complete search history.

(56) References Cited

U.S. PATENT DOCUMENTS

| 8,681,629 | B2 | 3/2014 | Nagy et al. |
| 8,917,309 | B1 | 12/2014 | Westin |
| 9,154,737 | B2 | 10/2015 | Thomas |
| 9,542,603 | B2 | 1/2017 | Feng |
| 2011/0216153 | A1 | 9/2011 | Tasker |
| 2014/0125755 | A1* | 5/2014 | Thomas ............... H04L 65/403 348/14.03 |

* cited by examiner

*Primary Examiner* — Joseph J Nguyen
(74) *Attorney, Agent, or Firm* — Polsinelli (57) ABSTRACT

The present disclosure provides systems, methods, and computer-readable media for generating resolution based content to be streamed at various remote displaying devices. In one aspect, a device includes at least one processor and at least one memory having computer-readable instructions, which when executed by the at least one processor, configure the at least one processor to determine one or more streaming resolutions according to which a video stream is displayed at one or more receiving endpoints; generate a resolution based content of a video stream for each of the one or more streaming resolutions, each resolution based content being a different representation of an environment captured by the video stream from other resolution based contents; and transmit each resolution based content to a corresponding one of the one or more receiving endpoints for display thereon.

10 Claims, 5 Drawing Sheets

METHODS AND SYSTEMS FOR GENERATING RESOLUTION BASED CONTENT

TECHNICAL FIELD

The present technology pertains to generating resolution based content for streaming video and audio content to different end points that support different streaming resolutions.

BACKGROUND

In today's interconnected world, video conferencing presents a very suitable option for many users located in different geographical locations to communicate and collaborate. Step by step, advancements in technologies related to video conferencing enable users to have an experience that resembles in person meetings where all users are physically present in a single location, can listen to other participants, present material and collaborate.

One such advancement is the use of tracking systems in video conferencing. By using one or more video and/or audio capturing devices, these systems are able to present to remote participants taking part in an online video conferencing session, different views of a conference room setting. These systems can select a different focus and a different zoom that corresponds to what is currently taking place in a conference room. For example, when someone is speaking, the system can present a zoomed in view of the speaker to the remote participants, and when no one is speaking, the tracking system can present a zoomed out view of the conference room to the remote participants.

Video conferences are often viewed on endpoints of many different forms. For example, one or more users may participate in a video conferencing session using their mobile devices or there may be many small picture-in-picture (PIP) windows displayed on a screen at each physical location, with each small PIP representing a view of other locations and users/participants taking part in the video conferencing session.

Currently, the tracking systems used for video conferencing do not take into account the different resolutions supported by different end points when determining various forms of representation of a conference room and its participants to be streamed to endpoints associated with remote participants. For example, regardless of the supported streaming resolution and the size of the end points, the tracking systems present a resized version of the same exact content on each endpoint device regardless of its corresponding streaming resolution.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

References to one or an embodiment in the present disclosure can be, but not necessarily are, references to the same embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various features are described which may be features for some embodiments but not other embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program services or functional processes include routines, programs, objects, components, data structures, etc., that perform particular tasks or implement particular abstract data types and may be implemented using hardware at network elements. Non-limiting examples of such hardware may include one or more Central Processing Units (CPUs), digital signal processors (DSPs), application-specific-integrated-circuits, field programmable gate arrays (FPGAs), computers or the like.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

1. Overview

In one aspect, a device includes at least one processor and at least one memory having computer-readable instructions, which when executed by the at least one processor, configure the at least one processor to determine one or more streaming resolutions according to which a video stream is displayed at one or more receiving endpoints; generate a resolution based content of a video stream for each of the one or more streaming resolutions, each resolution based content being a different representation of an environment captured by the video stream from other resolution based contents; and transmit each resolution based content to a corresponding one of the one or more receiving endpoints for display thereon.

In another aspect, a method includes receiving a request for content from one or more receiving endpoints, each of the one or more receiving endpoints having a corresponding streaming resolution; generating a resolution based content of a video stream for each of the one or more receiving endpoints based on the corresponding streaming resolution, each resolution based content being a different representation of an environment captured by the video stream from other resolution based contents; and transmitting each resolution based content to a corresponding one of the one or more receiving endpoints for display thereon.

In another aspect, a non-transitory computer-readable medium has computer-readable instructions, which when executed by at least one processor, causes the at least one processor to perform the functions of receiving a request for content from one or more receiving endpoints; determining one or more streaming resolutions according to which a video stream is displayed at the one or more receiving endpoints; generate a resolution based content of a video stream for each of the one or more streaming resolutions, each resolution based content being a different representation of an environment captured by the video stream from other resolution based contents; and transmitting to each of the one or more receiving endpoints one generated resolution based content corresponding to one of the one or more streaming resolution associated therewith.

2. Description

The present disclosure provides methods and systems related to providing resolution based content of a setting at endpoint devices capable of displaying content at different resolutions.

Figure 1:
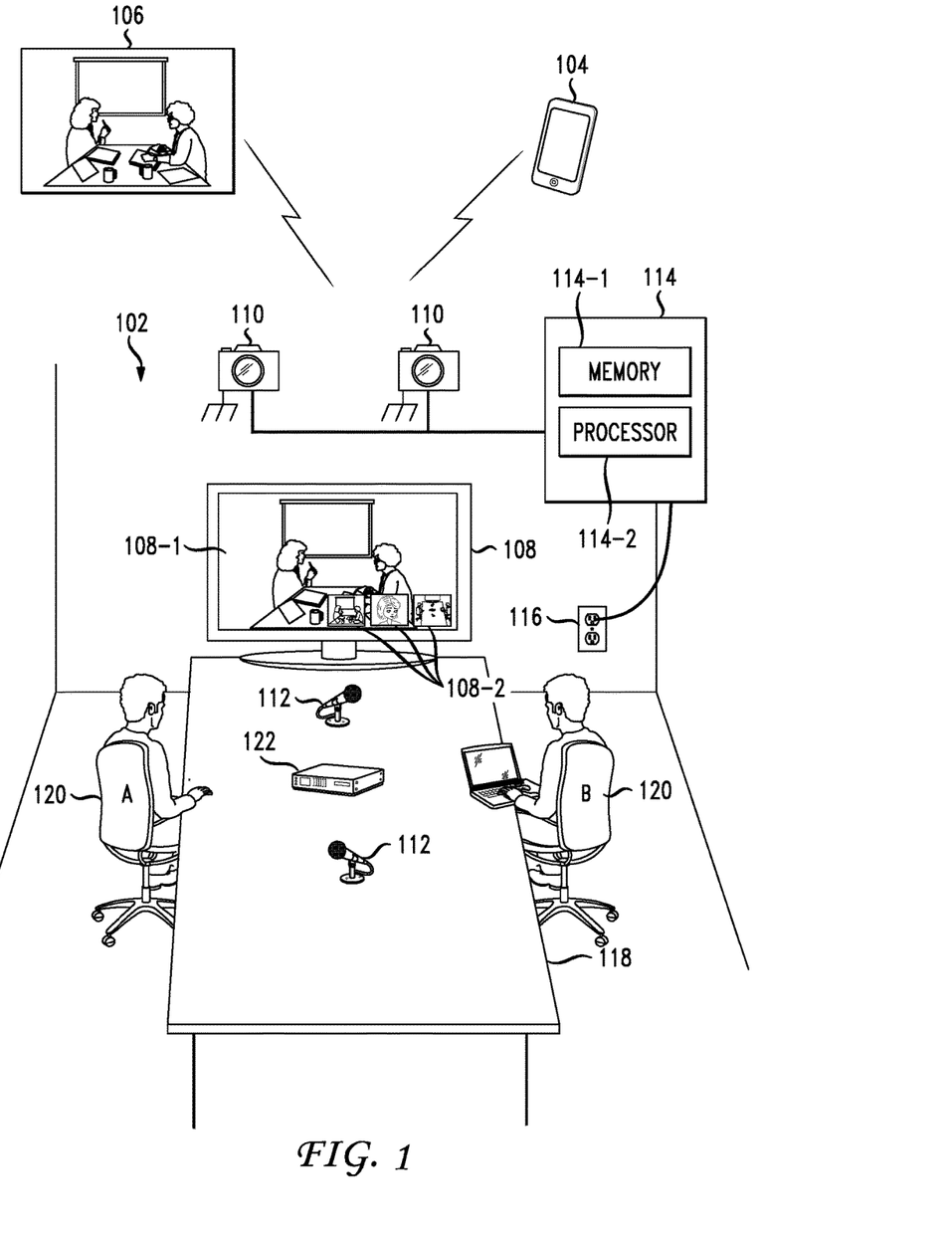
FIG. 1 illustrates a setting in which a tracking system is used for video conferencing, according to one aspect of the present disclosure.

FIG. 1 illustrates a setting in which a tracking system is used for video conferencing, according to one aspect of the present disclosure. In an example of an online collaboration session using video conferencing, setting 100 includes three separate parties participating in the online collaboration session. Setting 100 includes a conference room 102, a remote mobile device 104 and another conference room 106. The conference rooms 102 and 106 and the mobile device 104 are remotely connected to one another through the appropriate local area connections and over the internet, as is known. In other words, the conference rooms 102 and 106 and the mobile device 104 are located in different geographical locations.

FIG. 1 illustrates details of a tracking system used in conference room 102 are illustrated. As shown, conference room 102 includes a display 108, cameras 110, microphones 112, a processing unit 114 and a connection 116 that in one example provides an Ethernet connection to a local area network (LAN) in order for the processing unit 114 to transmit content and/or receive content to and from mobile device 104 and/or conference room 106.

Conference room 102 can further include a desk 118 and one or more chairs 120 for participants to use during their presence in conference room 102 (such as participants (speakers) A and B). There can also be a control unit 122 located on table 118, through which various components of a tracking system and video conferencing system can be controlled (e.g., the display 108, cameras 110, microphones 112, etc.). For examples, turning the system ON or OFF, adjusting volume of speaker(s) associated with display 108, muting microphones 112, etc., can be controlled via control unit 122.

Display 108 may be any known or to be developed display device capable of presenting a view of other remote participating parties (e.g., the participant using mobile device 104 and/or participant(s) in conference room 106. As shown in FIG. 1, display 108 has a display section 108-1 and a plurality of thumbnail display sections 108-2. In one example, display section 108-1 displays a view of a current speaker during the video conferencing session. For example, when a participant associated with mobile device 104 speaks, display section 108-1 displays a view of the participating associated with mobile device 104 (which may also include the surrounding areas of the participant visible through a camera of mobile device 104). At the same time, each of thumbnail display sections 108-2 represents a small version of a view of each different remote location and its associated participants taking part in the video conferencing session. For example, assuming that conference room 102 is a branch of company A located in New York and conference room 106 is another branch of company A located in Los Angeles and mobile device 104 is associated with an employee of company A teleworking from Seattle, then one of thumbnail display regions 108-2 corresponds to a view of conference room 102 and its participants as observed by cameras 110, another one of thumbnail display regions 108-2 corresponds to a view of conference room 106 and its participants as observed by cameras installed therein and another one of thumbnail display regions 108-2 corresponds to a view of the teleworking employee of company A using mobile device 104. Furthermore, each thumbnail display region 108-2 can have a small caption identifying a geographical location of each of conference rooms 102 and 106 and mobile device 104 (e.g., New York office, Los Angeles office, Seattle, Wash., etc.).

In one example, thumbnail display images 108-2 may be overlaid on display section 108-1, when display section 108-1 occupies a larger portion of the surface of display device 108 than shown in FIG. 1.

Cameras 110 may be a pair of any known or to be developed video capturing devices capable of adjusting corresponding capturing focus, angle, etc., in order to capture a representation of conference room 102 depending on what is happening in conference room 102 at a given point of time. For example, if participant A is currently speaking, one of the cameras 110 can zoom in (and/or tilt horizontally, vertically, diagonally, etc.) in order to present/capture a focused stream of participant A to participants at mobile device 104 and/or conference room 106, a close up version of participant A rather than a view of the entire conference room 102 which results in participant A and/or B being shown relatively smaller (which makes it more difficult for remote participants to determine accurately who the current speaker in conference room 102 is).

Microphones 112 may be strategically positioned around conference room 102 (e.g., on table 118 in FIG. 1) in order to provide for optimal capturing of audio signals from participants present in conference room 102.

In one example, cameras 110 zoom in and out and adjust their capturing angle of content of conference room 102 depending, in part on audio signals received via microphones 112 and according to any known or to be developed method.

Processing unit 114 includes one or more memories such as memory 114-1 and one or more processors such as processor 114-2. In one example, processing unit 114 controls operations of display 108, cameras 110, microphones 112 and control unit 122.

Processing unit 114, display 108, cameras 110, microphones 112 and control unit 122 form one example of a tracking system described above. This tracking system can be the SpeakerTrack system developed, manufactured and distributed by Cisco Technology, Inc., of San Jose, Calif.

Memory 114-1 can have computer-readable instructions stored therein, which when executed by processor 114-2, transform processor 114-2 into a special purpose processor configured to perform functionalities related to enabling video conferencing and known functionalities of tracking system used in conference room 102. Furthermore, the execution of such computer-readable instructions, transform processor 118-2 into a special purpose processor for creating resolution based content as will be described below.

In one example processing unit 114 may be located at another location and not in conference room 102 (e.g., may be accessible and communicate with components described above via any known or to be developed public and private wireless communication means.

In one example, conference room 106 utilizes a tracking system similar to or exactly the same as tracking system installed in room 102, as described above.

While certain components and number of different elements are described as being included in setting 100, the present disclosure is not limited thereto. For example, there may be more or less participants participating in a video conferencing session via their corresponding devices than that shown in FIG. 1. There may be more or less participants in each conference room shown in FIG. 1. Mobile device 104 is not limited to being a mobile telephone device but can instead be any known or to be developed mobile computing device having necessary components (e.g., a microphone, a camera, a processor, a memory, a wired/wireless communication means, etc.) for communicating with other remote devices in a video conferencing session.

Furthermore, software/hardware for enabling the video conferencing session may be provided by various vendors such as Cisco Technology, Inc. of San Jose, Calif. Such software program may have to be downloaded on each device or in each conference room prior to being able to participate in an online video conferencing session. By installing such software program, participants can create, schedule, log into, record and complete one or more video conferencing sessions.

In the above described example of a video conferencing session between participants in conference rooms 102 and 106 as well as the participant associated with mobile device 104, all participants are presented with a same view of other remote participants and their surrounding regardless of a resolution with which their devices accepts and displays video streams. For example, a track system utilized in conference room 102 presents an overview of conference room 102 and its participants when both participants A and B speak (or not participant is speaking) in order for participants in conference room 106 and at mobile device 104 to be able to see both participants A and B. This overview presentation is replicated on a display of mobile device 104 and on a display available in conference room 106. In other words, while the same content (same overview of conference room 102) is replicated and presented to participants at mobile device 104 and in conference room 106, each replication is adjusted in size to fit to the display of mobile device 104 and or the display at conference room 106. For example, the overview of conference room 102 is downsized for presentation at mobile device 104 because mobile device 104 has a smaller screen and can support a smaller resolution stream (e.g., 540p resolution) as opposed to a higher resolution stream (e.g., 1080p resolution) supported by display 108 of conference room 102 or that of conference room 106.

Given the smaller resolution stream provided to mobile device 104, the participant at device 104 may not be able to see participants A and/or B as accurately as a participant present in conference room 106, because in addition to participants A and B that may be currently speaking, the stream on mobile device 104 also includes an overview of conference room 102 as well. In this example, having a depiction of the surrounding areas of speakers A and B, at mobile device 104 may not be necessary due to the smaller screen size and the smaller streaming resolution supported at mobile device 104.

In other words, currently utilized video conferencing and their associated tracking systems, generate a single stream for transmission and display at displays of remotely connected endpoints (e.g., mobile device 104 and conference room 106) and downsizes (or upsizes) the single stream to adapt to the stream resolution supported at each connected endpoint. Hereinafter, examples will be described where a stream resolution supported at each endpoint is taken into consideration in order to generate content that is specific for the corresponding endpoint. Thus each endpoint, depending on its corresponding stream resolution may be provided with a different content. For example, in the scenario described above, what is presented to the participant at mobile device 104 is different from that presented to participants in conference room 106 in that the content for mobile device 104 may be cropped to eliminate the environment surrounding participants A and B in conference room 102 and instead present a stream that is more focused on participants A and B so that a better view of the speaking participants A and B is presented to the participant at mobile device 104. At the same time and assuming that the display in conference room 106 is similar to display 108 in conference room 102, the entire overview of participants A and B and conference room 102 is presented on display in conference room 106.

In examples described herein reference can be made to low resolution streams and high resolution streams, specific examples of which are 540p resolution and 1080p resolution, specifically. However, the present disclosure is not limited thereto and multiple stream resolutions that are lower than 540p, are in between 540p and 1080p or are higher than 1080p can also be used and have content generated in accordance thereto.

Figure 2:
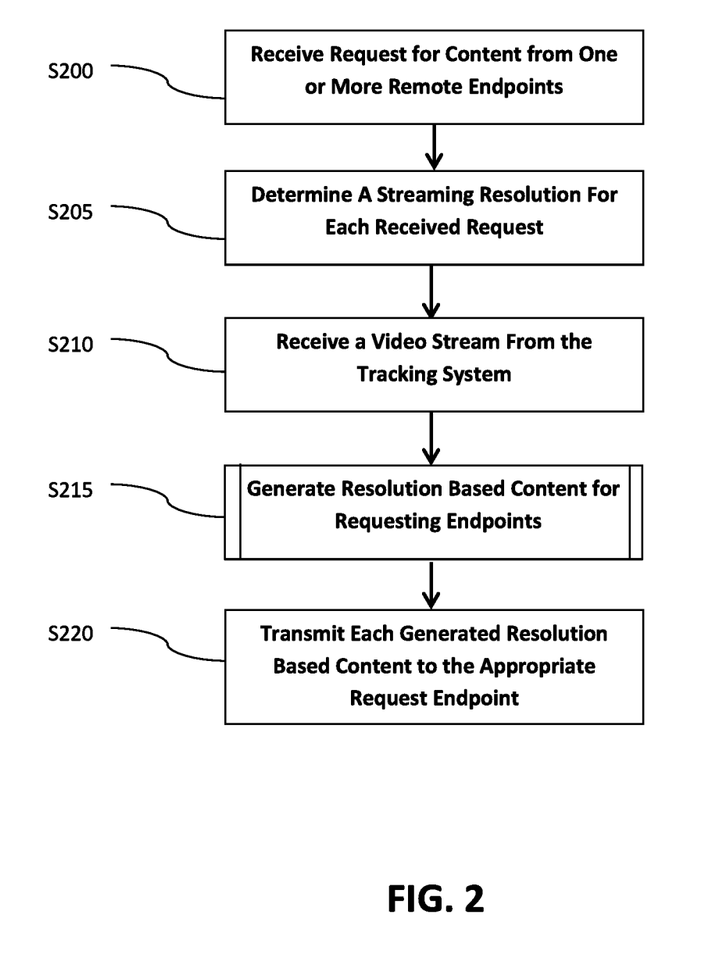
FIG. 2 illustrates a method of creating and sharing resolution based content, according to an aspect of the present disclosure.

FIG. 2 illustrates a method of creating and sharing resolution based content, according to an aspect of the present disclosure. FIG. 2 will be described from a perspective of processing unit 114 of FIG. 1 and more specifically processor 114-2 of processing unit 114.

At S200, processor 114-2 receives request for content from one or more remote endpoints. As described above, endpoints refers to devices located remotely relative to conference room 102 that are participating in a video conferencing session and have participants associated therewith partaking in the session. For example, at S200 processor 114-1 receives such request from mobile device 104 and/or a processing unit in (or associated with) conference room 106.

At S205, processor 114-2 determines a streaming resolution for each received request. Processor 114-2 determines each streaming resolution as follows.

In one example, a communication session established between any two remotely located devices participating in an online video conferencing session (e.g., between processing unit 114 and mobile device 104, between processing unit 114 and processing unit of conference room 106, between mobile device 104 and processing unit of conference room 106), uses a secure communication protocol, examples of which include, but are not limited to, a Hyper Text Transfer Protocol Secure (HTTPS) session, an Internet Protocol Secure (IPsec) session, a Point to Point Tunneling Protocol (PPTP) session, a Layer 2 Tunneling Protocol (L2TP) session, etc.

In order to establish any of the above example secure communication sessions, initially a process known as handshaking is performed between the two endpoints of each communication session (e.g., between processing unit 114 and mobile device 104, between processing unit 114 and processing unit of conference room 106, between mobile device 104 and processing unit of conference room 106). As part of each handshake process, the receiving endpoint entity requests a streaming resolution, which processor 114-2 assigns to the receiving endpoint.

At S210, processor 114-2 receives a video stream from the tracking system in conference room 102. More specifically, processor 114-2 receives a video stream of a current situation in conference room 102, from one or more of cameras 110 in conference room 102. For example, processor 114-2 can receive a general overview of conference room 102 including all of its participants if no participant is currently speaking in the video conferencing session or if multiple participants are engaging in an exchange or if a participant is entering or leaving conference room 102, etc. In another example, the received video stream may be that of only the participants that are engaging in an exchange. In another example, the received video stream may be a close up view of a single participant present in conference room 102 that is currently speaking and/or presenting material during the video conference session. Examples of video streams are not limited to the ones described here any may be any other video stream that is a representation of a combination of all or some or one of the elements present in conference room 102.

At S215, processor 114-2 generates resolution based content, based on the received video stream at S210, for each endpoint from which a request for content has been received at S200. Processor 114-2 generates resolution based content for each requesting endpoint, according to a streaming resolution determined therefor at S210. Resolution based content is content that is modified for optimal representation at each endpoint device based on a corresponding streaming resolution. Examples of generating resolution based content at S215 will be described in detail with reference to FIGS. 3-5.

Upon generating resolution based content for each endpoint device at S215, at S220, processor 114-2 transmits each resolution based content to an appropriate one of the requesting endpoint(s) according a streaming resolution supported by each requesting endpoint. In one example, such streaming can be over the established bi-directional communication sessions between processing unit 114 and each of the receiving endpoints (e.g., mobile device 104 and/or processing unit in conference room 106).

Figure 3:
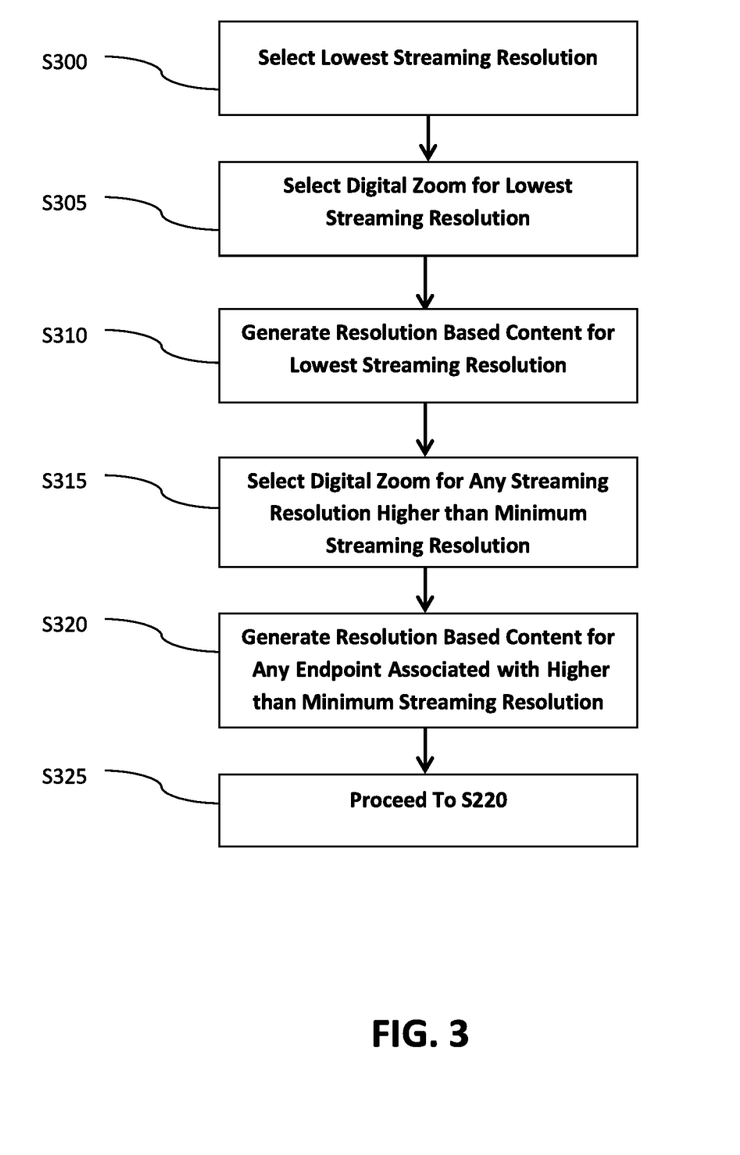
FIG. 3 illustrates a method of generating resolution based content, according to an aspect of the present disclosure.

FIG. 3 illustrates a method of generating resolution based content, according to an aspect of the present disclosure. Similar to FIG. 2, FIG. 3 will be described from a perspective of processing unit 114 of FIG. 1 and more specifically processor 114-2 of processing unit 114.

As described with reference to FIG. 2, at S205, processor 114-2 determines a streaming resolution for each requesting endpoint (based on the handshake process performed for establishing a communication session between processing unit 114 and each requesting endpoint (e.g., mobile device 104 and/or processing unit of conference room 106). For example, processor 114-2 determines a streaming resolution of 540p for mobile device 104 and a streaming resolution of 1080p for processing unit and associated display in conference room 106. As mentioned above, streaming resolutions of different receiving endpoints are not limited to 540p and 1080p only.

At S300, processor 114-2 selects the lowest one of the streaming resolutions determined at S205. In this example, processor 114-2 selects 540p as the lowest streaming resolution.

At S305, processor 114-2 selects a digital zoom for the lowest streaming resolution selected at S305. In one example, processing unit 114 supports up to 6× digital zoom for a 540p streaming resolution. Therefore, at S305, processor 114-2 determines an appropriate digital zoom (e.g., between 1× to 6×) for the video stream received at S210.

The appropriate digital zoom depends on the exact video stream received at S210. For example, if the video stream is of only one participant (e.g., participant A) speaking, then processor 114-2 may select a higher zoom in order to provide a clearer rendition of participant A. For example, the processor 114-2 may select a 5× digital zoom in this case for cropping the video stream and zooming in on participant A. In another example, if the video stream is of the entire conference room 102, processor 114-2 may select a lower digital zoom for cropping the video stream (e.g., 1.5× digital zoom in order to provide a clearer rendition of the entire conference room 102). This selection of a proper digital zoom for cropping the video stream received at S210 may be performed according to any known or to be developed method utilized for cropping captured video streams.

At S310, and based on the selected digital zoom at S305, processor 114-2 generates resolution based content for the lowest streaming resolution determined at S300. In one example of generating this resolution based content, processor 114-2 crops the received video stream at S210 to create a resolution based content for the endpoint receiver (e.g., mobile device 104) having the lowest streaming resolution. For example, processor 114-2 crops the video stream received at S210 using the appropriate digital zoom factor for the 540p streaming resolution, determined at S305.

At S315 and for any other requesting endpoint having a streaming resolution higher than the minimum streaming resolution, processor 114-2 selects a digital zoom that is capped at the highest digital zoom factor for that specific higher streaming resolution (e.g., minimum of the highest digital zoom factor for that specific higher streaming resolution and a selected digital zoom factor for the minimum streaming resolution). For example, processing unit 114 can select between 1× to 3× digital zoom factor for a 1080p streaming resolution. Therefore, at S315, processor 114-2 selects the minimum of the digital zoom selected for the 540p streaming resolution at S305 and the 3× digital zoom available for a 1080p streaming resolution.

For example, if the selected digital zoom at S305 is 5×, then at S315, processor 114-2 selects the 3× digital zoom (capped at 3×) with which the processor 114-2 crops the video stream for the 1080p streaming resolution (to be send to processing unit of conference room 106, for example). In another example, if the selected digital zoom at S305 is 1.5×, then at S315, processor 114-2 also selects a 1.5× zoom for the 1080p streaming resolution.

The process at S315 is repeated for any streaming resolution determined at S205 that is higher than the minimum streaming resolution.

At S320, and based on the selected digital zoom at S315, processor 114-2 crops the received video stream at S210 to create a resolution based content for the requesting endpoint receiver (e.g., mobile device 104) having the 1080p resolution (and/or any other requesting endpoint having a streaming resolution higher than the minimum streaming resolution).

Thereafter, at S325, the process reverts back to S220 of FIG. 2.

Figure 4:
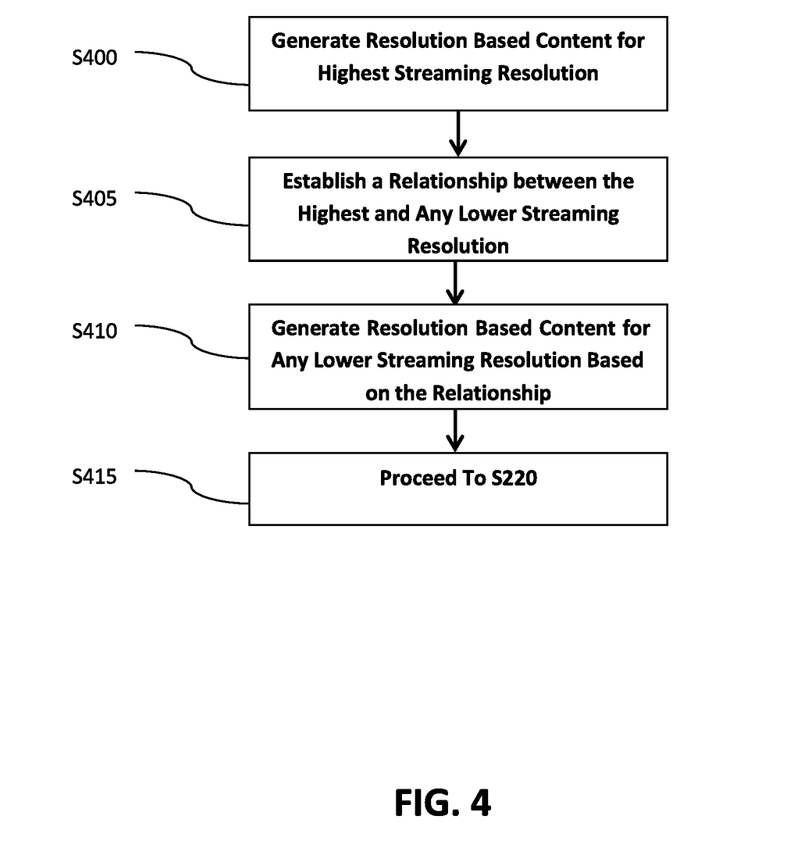
FIG. 4 illustrates a method of generating resolution based content, according to an aspect of the present disclosure.

FIG. 4 illustrates a method of generating resolution based content, according to an aspect of the present disclosure. Similar to FIGS. 2 and 3, FIG. 4 will be described from a perspective of processing unit 114 of FIG. 1 and more specifically processor 114-2 of processing unit 114.

At S400, processor 114-2 generates resolution based content for the highest streaming resolution determined at S205. For example, if the highest resolution stream at S205 is a 1080p streaming resolution, then at S400, processor 11402 generates resolution based content from the video stream received at S210, for the 1080p streaming resolution. The generation of the resolution based content can be the same as that described above. For example, processor 114-2 can select an appropriate digital zoom between 1× and 3× and crop the video stream accordingly.

Thereafter, at S405, for any streaming resolution determined at S205 that is lower the maximum streaming resolution, processor 114-2 establishes a relationship between the maximum streaming resolution and each lower streaming resolution. For example, processor 114-2 determines that the 1080p streaming resolution has a resolution that is twice that of the 540p streaming resolution.

Thereafter, at S410 and based on the relationship established at S405, processor 114-2 crops the resolution based content determined at S400 for the highest streaming resolution in order to generate resolution based content for each lower streaming resolution.

For example, given the established relationship that a 1080p streaming resolution is twice that of a 540p streaming resolution, at S410, processor 114-2 crops the resolution based content generated at S400 for the 1080p streaming resolution by a zoom factor of 2×, in order to generate resolution based content for the 540p streaming resolution.

Thereafter, at S415, the process reverts back to S220 of FIG. 2.

An example of applying the method of FIG. 4 would be as follows. Given a streaming video depicting a two active speakers A and B and a portion of their surrounding in conference room 102, processor 114-2, at S400, can select, for example, a digital zoom of 1.5× and generates the content for the 1080p streaming resolution depicting the active speakers A and B as well as the table and chairs 118 and 120. Thereafter, at S410, processor 114-2 further crops the content generated for the 1080p streaming resolution with a digital zoom of 2× and creates a more closed up view of the active speakers A and B (e.g., no longer showing the table 118 and the chairs 120) as resolution based content for the 540p streaming resolution. Thereafter, processor 114-2 transmits the resolution based content for the 540p streaming resolution to mobile device 104 in order for mobile device 104 to better view the active speakers A and B. Processor 114-2 also transmits the resolution based content generated for the 1080p streaming resolution to be displayed on a display at conference room 106, which shows a broader view (different content) relative to that generated for and sent to mobile device 104.

Figure 5:
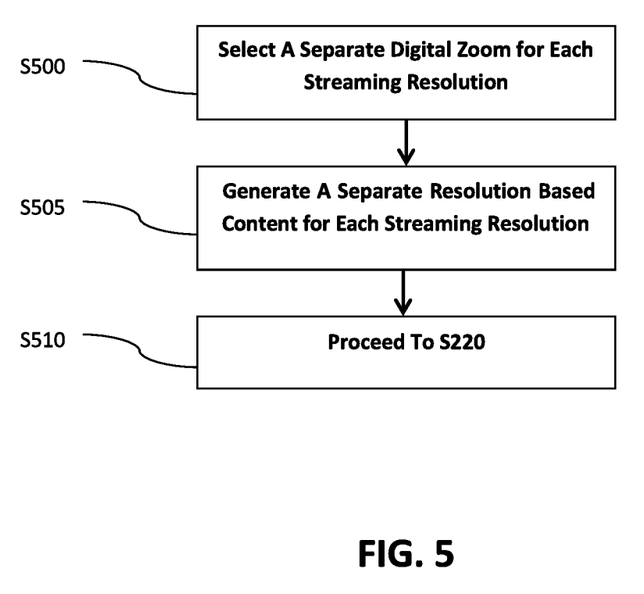
FIG. 5 illustrates a method of generating resolution based content, according to an aspect of the present disclosure.

FIG. 5 illustrates a method of generating resolution based content, according to an aspect of the present disclosure. Similar to FIGS. 2-4, FIG. 5 will be described from a perspective of processing unit 114 of FIG. 1 and more specifically processor 114-2 of processing unit 114.

In contrast to the resolution based content generation methods of FIGS. 3 and 4, FIG. 5 describes a method in which processor 114-2 performs two parallel and separate processes for generating each resolution based content independently of other resolution based contents. While an assumption is made that only two different streaming resolutions are determined at S205 in these examples as well as for FIG. 5, there may be more than two different streaming resolutions and thus more than two parallel and separate resolution based content generation processes.

At S500 and for each different streaming resolution determined at S205, processor 114-2 selects an appropriate digital zoom (e.g., between 1× to 6× for a 540p streaming resolution and between 1× and 3× for a 1080p streaming resolution). As described above, this selection may be based on the video streaming and the depiction of conference room 102 and/or active speakers therein.

At S505, processor 114-2 generates a different resolution based content for each different streaming resolution based on a corresponding selected digital zoom at S500.

Thereafter, the process reverts back to S220 of FIG. 2, where various generated resolution based contents are transmitted to appropriate requesting endpoints.

A few examples of separate and parallel resolution based content generation according to FIG. 5, will now be described.

In one example, assuming that speaker A in conference room 102 is currently speaking, when processor 114-2 selects a digital zoom at S500 for the 1080p streaming resolution, such digital zoom can be, for example, 2×. Accordingly, at S505, processor 114-2 crops the video stream to generate 1080p based content that includes a close up view of speaker A and perhaps a relatively small area surrounding speaker A. Thereafter, when speaker A stops talking, processor 114-2 immediately generates a new 1080p based content that includes the overview of conference room 102 and all of its participants.

Under the same assumption, when processor 114-2 selects a digital zoom at S500 for the 540p streaming resolution, such digital zoom can be, for example, 3×. Accordingly, at S505, processor 114-2 crops the video stream to generate 540p based content that includes a close up view of speaker A without showing any surrounding area of speaker A. Thereafter, when speaker A stops talking, processor 114-2 would wait a longer period of time (e.g., 5 seconds, 10 seconds, etc.) to provide more detail of speaker A (relative to the case of 1080p described in the above paragraph) before generating a new 540p based content that includes another overview of conference room 102 and its participants.

In one example, assuming that speakers A and B in conference room 102 are engaging in a dialogue, when processor 114-2 selects a digital zoom at S500 for the 1080p streaming resolution, such digital zoom can be, for example, 1.5×. Accordingly, processor 114-2 crops the video stream to generate 1080p based content that includes a close up view of speakers A and B and perhaps a relatively small area surrounding speakers A and B rather than continuously switching between a view of speaker A and a view of speaker B.

Under the same assumption, when processor 114-2 selects a digital zoom at S500 for the 540p streaming resolution, such digital zoom can be, for example, 3×. Accordingly, processor 114-2 crops the video stream to generate 540p based content that includes a close up view of speaker A or speaker B without any surrounding area of speaker A and switches between the two speakers. Alternatively, processor 114-2 generates two separate 540p contents, one including speaker A and one including speaker B, and transmits both contents to the endpoint device for a side by side display on the receiving endpoint device (e.g., mobile device 104).

For clarity of explanation, in some instances the present technology may be presented as including individual functional blocks including functional blocks comprising devices, device components, steps or routines in a method embodied in software, or combinations of hardware and software.

In another example, when generating a 540p based content, processor 114-2 avoids including an overview of conference room 102 in any generated content except, for example, when a participant/speaker enters or leaves conference room 102 (or alternatively generated 540p content to depict a close up view of a participant that enters conference room 102).

In examples described above, an assumption is made that each requesting endpoint device/system has a different streaming resolution associated therewith. However, the present disclosure is not limited thereto and there can be two or more requesting endpoints having the same streaming resolution (e.g., 540p, 1080p, etc.).

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

We claim:

1. A device comprising:
   at least one processor, and
   at least one memory having computer-readable instructions, which when executed by the at least one processor, configure the at least one processor to:
   determine one or more streaming resolutions according to which a video stream is displayed at one or more receiving endpoints;
   generate a resolution based content of a video stream for each of the one or more streaming resolutions, each resolution based content being a different representation of an environment captured by the video stream from other resolution based contents, the generate comprising:
     select a digital zoom factor for the lowest one of the one or more streaming resolutions;
     based on the digital zoom factor, generate a first resolution based content from the video stream for the lowest one of the one or more streaming resolutions; and
     generate a resolution based content for each of the remaining ones of the one or more streaming resolutions based on the first resolution based content;
   transmit each resolution based content to a corresponding one of the one or more receiving endpoints for display thereon.

2. The device of claim 1, wherein the execution of the computer-readable instructions further configure the at least one processor to,
   receive a request for content from the one or more receiving endpoints, each of the one or more receiving endpoints being associated with one of the one or more streaming resolutions; and
   determine each of the one or more streaming resolutions based on communication scheme according to which the device communicates with a corresponding one of the one or more receiving endpoints.

3. The device of claim 1, wherein the execution of the computer-readable instructions configure the at least one processor to generate the first resolution based content by cropping the video stream according to the digital zoom factor.

4. The device of claim 1, wherein the execution of the computer-readable instructions configure the at least one processor to,
   determine a corresponding maximum digital zoom factor allowed for each of the remaining ones of the one or more streaming resolutions;
   determine a corresponding minimum value of the corresponding maximum digital zoom factor and the digital zoom factor for the lowest one of the one or more streaming resolutions; and
   generate a corresponding resolution based content for each of the remaining ones of the one or more streaming resolutions is further based on the corresponding minimum value for each of the remaining ones of the one or more streaming resolutions.

5. The device of claim 4, wherein the execution of the computer-readable instructions configure the at least one processor to generate each corresponding resolution based content by cropping the video stream according to a corresponding maximum value.

6. The device of claim 1, wherein the execution of the computer-readable instructions configure the at least one processor to independently generate each resolution based content for each of the one or more streaming resolutions.

7. A method comprising:
   receiving a request for content from one or more receiving endpoints, each of the one or more receiving endpoints having a corresponding streaming resolution;
   generating a resolution based content of a video stream for each of the one or more receiving resolutions based on the corresponding streaming resolution, each resolution based content being a different representation of an environment captured by the video stream from other resolution based contents, the generating comprising:
     selecting a digital zoom factor for the lowest one of the one or more streaming resolutions;
     based on the digital zoom factor, generating a first resolution based content from the video stream for the lowest one of the one or more streaming resolutions; and
     generating a resolution based content for each of the remaining ones of the one or more streaming resolutions based on the first resolution based content;
   transmitting each resolution based content to a corresponding one of the one or more receiving endpoints for display thereon.

8. The method of claim 7, wherein the generating a resolution based content for each of the remaining ones of the one or more streaming resolutions is based content according to a minimum of the zoom factor associated with the lowest streaming resolution and a maximum zoom factor associated with a corresponding one of every other streaming resolution.

9. The method of claim 7, wherein the generating the resolution based content comprises:
   independently generating a separate resolution based content for each streaming resolution associated with the one or more receiving endpoints.

10. A non-transitory computer-readable medium having computer-readable instructions, which when executed by at least one processor, causes the at least one processor to perform the functions of:

receiving a request for content from one or more receiving endpoints;
determining one or more streaming resolutions according to which a video stream is displayed at the one or more receiving endpoints;
generating a resolution based content of a video stream for each of the one or more streaming resolutions, each resolution based content being a different representation of an environment captured by the video stream from other resolution based contents, the generating comprising:
  selecting a digital zoom factor for the lowest one of the one or more streaming resolutions;
  based on the digital zoom factor, generating a first resolution based content from the video stream for the lowest one of the one or more streaming resolutions; and
  generating a resolution based content for each of the remaining ones of the one or more streaming resolutions based on the first resolution based content;
transmitting to each of the one or more receiving endpoints one generated resolution based content corresponding to one of the one or more streaming resolution associated therewith.

* * * * *